UNITED STATES PATENT OFFICE.

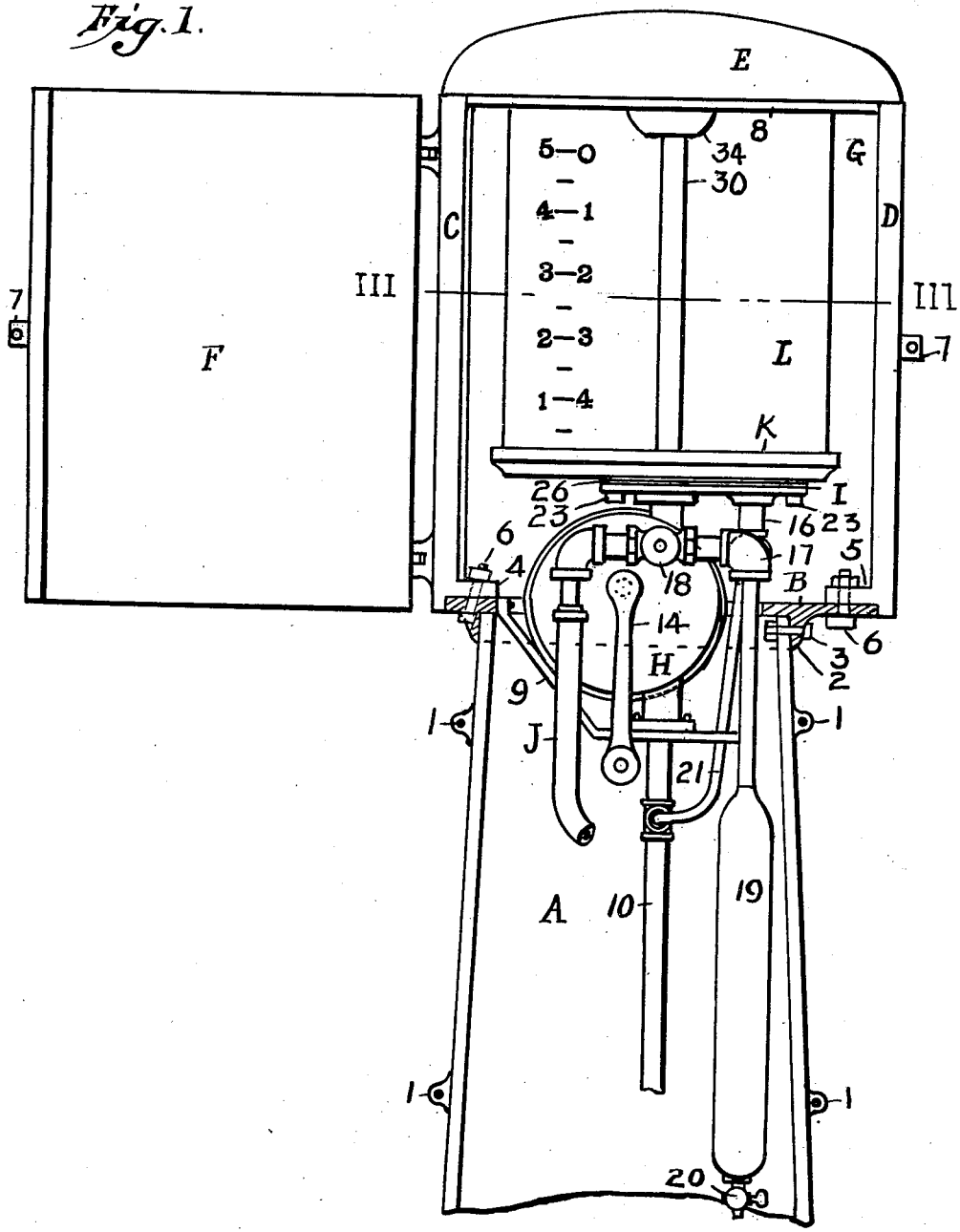

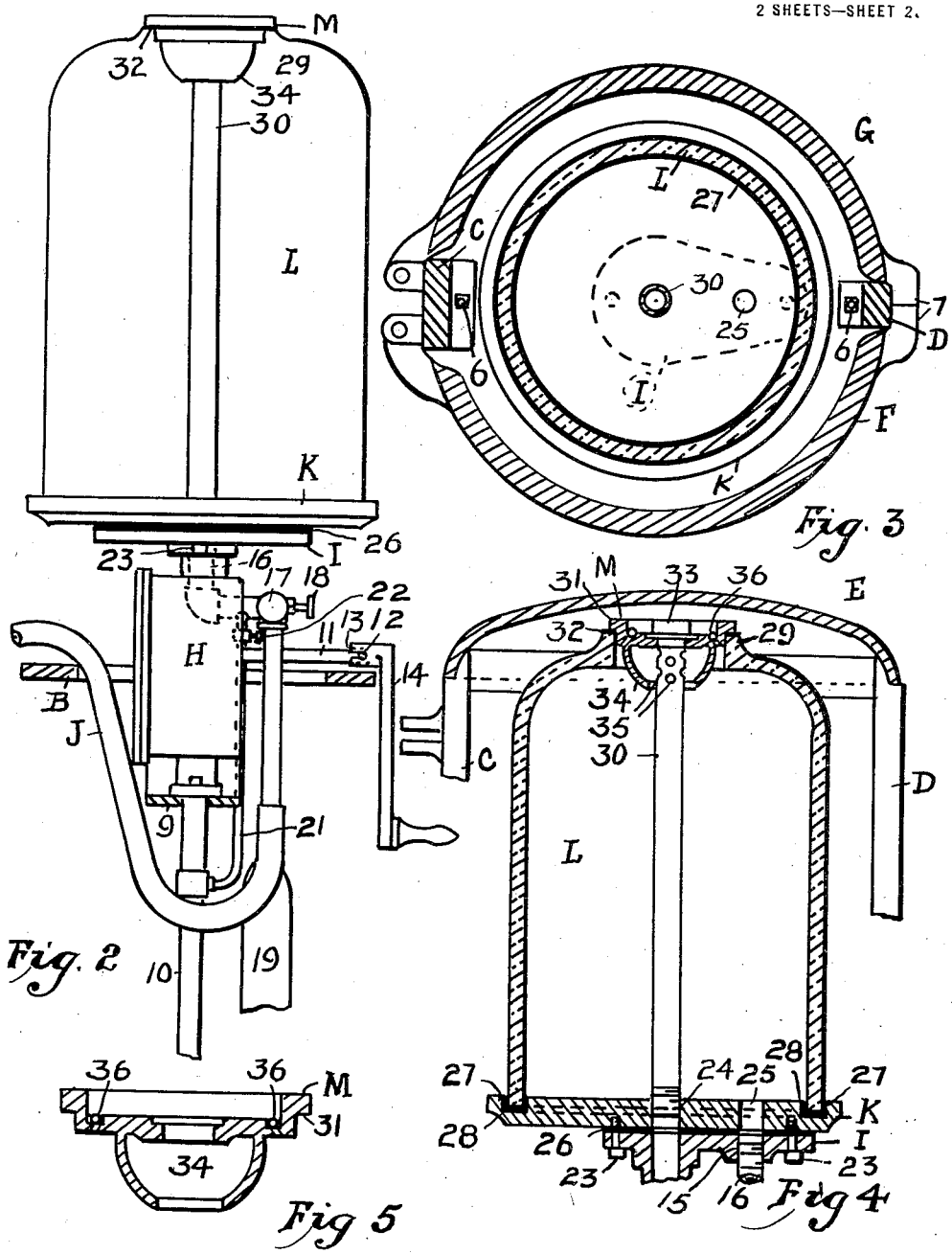

DAVID A. CRAWFORD, OF EMLENTON BOROUGH, PENNSYLVANIA.

MEASURING AND DISPENSING APPARATUS.

1,279,661.  Specification of Letters Patent.  Patented Sept. 24, 1918.

Application filed October 24, 1916. Serial No. 127,332.

*To all whom it may concern:*

Be it known that I, DAVID A. CRAWFORD, a citizen of the United States, and residing in the borough of Emlenton, in the county of Venango and State of Pennsylvania, have invented or discovered new and useful Improvements in Measuring and Dispensing Apparatus, of which the following is a specification.
My invention consists in a new and improved measuring and dispensing apparatus for liquids. It is especially intended for use as a gasolene dispensing station, but is likewise adapted for the measuring and delivery of all kinds of liquids.

The object in view is the provision of inexpensive yet substantial apparatus for the purposes mentioned which will accurately measure the liquid to be dispensed in full view of the purchaser, and dispense the same without shortage or waste; which is capable of rapid and easy operation, and will not be rendered inaccurate by wear or through manipulation, and which can be completely inclosed and protected against unauthorized tampering.

Many novel features of construction and arrangement of parts will appear from the following description.
In the accompanying drawings, which are however merely illustrative of the principles of my invention and not intended to limit the scope of the same to the construction shown, Figure 1 is an elevation of my improved apparatus, the base being shown open by the omission of one of its sections, and one of the top doors being swung back to expose the parts; Fig. 2 is an elevation taken at right angles to Fig. 1, showing the pump, the measuring receptacle and the dispensing hose; Fig. 3 is a cross section along the line III—III in Fig. 1, the top doors being shown closed; Fig. 4 is a detail in vertical section showing the method of mounting the receptacle in the apparatus, and Fig. 5 is an enlarged vertical section of the lid of the measuring receptacle.

The following is a detailed description of the drawings.
The frame or outer casing of the apparatus comprises a hollow metal supporting base or pillar, A, which rests on a suitable foundation, not shown, such as the side walk or curb and beneath which is usually buried the storage tank which contains the supply of gasolene or other liquid. Such storage tank, not forming part of the present invention, is not shown. The base may be formed of two sections or halves joined together along their vertical edges as by means of the pierced lugs 1.

Mounted on top of the base A is a ring platform B, provided with a depending flange 2 which encircles the top of the base A and is secured thereto, as by the bolts 3.

C and D are oppositely located standards whose inwardly extending feet, 4 and 5, are secured to the platform B, as by the bolts 6. The upper ends of said standards are secured to and support the dome or canopy-top E.

F and G represent a pair of doors hinged to the opposite edges of the standard C and closing against the opposite edges of the standard D, pierced ears 7 being provided on said doors for the application of a suitable locking device. When closed the doors fit against the edge of platform B and against a depending flange 8 on the top E.

H is a pump mounted on the platform B as by means of the bracket or stirrup 9. The inlet port of said pump is connected to a pipe 10 which leads upwardly within the base A from the gasolene supply tank.

11 is the operating shaft of the pump, whose protruding end, within the closure of the doors F and G, is provided with a radial pin 12 which engages with a slot 13 in the hub of the crank handle 14, so that when the doors are open, the handle may be slipped on the shaft and the pump operated, while by removing the handle and laying it on the platform B, the doors may be closed and locked, and unauthorized operation of the pump thus prevented.

The outlet port of the pump extends up through a horizontal base plate I which forms part of the pump assembly and supports the measuring receptacle assembly.

To one side of the said outlet port, the plate I is provided with a vertical, threaded hole 15, up into which is screwed the inlet end of the gasolene dispensing pipe 16 in which is interposed the fitting 17 and the stop cock 18. To the outer end of the pipe 16 is attached the dispensing hose J whose intermediate portion is looped down through the platform B into the base A, out of the way.

19 is a depending water filter or sump, located within the base A and communicating with the fitting 17 for the removal of any water from the gasolene as it passes to the hose J. A stop cock 20 is provided at the bottom of the filter for draining the same when necessary.

A by-pass pipe 21 leads from the pipe 16, between the plate I and the stop cock 18 and connects with the supply pipe 10, and 22 is a stop cock in said by-pass.

K is a circular bottom plate which is mounted on and removably secured to the base plate I, as by the screw-bolts 23. Said plate K is provided with a threaded axial hole 24 which registers with the outlet port of the pump H extending up through the plate I. Said plate K is further provided with a second hole 25 which registers with the hole 15 in the plate I. 26 is a compressible packing interposed between the plates I and K to prevent the lateral leakage of gasolene.

The upper face of said plate K is provided adjacent to its edge with an annular seat or groove 27, preferably of rectangular cross section.

L is a glass cylinder whose lower edge seats loosely in said seat 27. Before mounting the cylinder, said seat is partially filled with a suitable plastic cement 28 which is displaced by the lower edge of the cylinder and flows up about the same and hardens to form a gas-tight joint between the receptacle and the bottom plate.

The upper end of the cylinder L is contracted and provided with an upwardly extending annular mouth flange 29.

30 is a stand pipe or tube whose lower end is threaded and screwed into the axial hole 24 of the plate K and is thus in communication with the pump.

M is a metal lid provided with an annular edge shoulder 31 which fits down on the flange 29 of the cylinder L, a gasket 32 being interposed to provide a gas-tight joint. The central portion of said lid is preferably sunken and is provided with an axial opening through which the upper end of the stand pipe 30 extends. The said pipe end is threaded to receive a cap 33 which closes the end of the pipe and bears down on the lid M, thus clamping together the elements of the measuring receptacle assembly. Depending from the cap M and loosely surrounding the pipe 30 is a globe shield 34. Within said shield the pipe is provided with a plurality of discharge perforations 35 which permit of the downward flow of gasolene from the pipe into the interior of the measuring receptacle, the shield 34 preventing spraying and splashing of the liquid.

A number of outwardly opening ball valves 36 are provided in the cap M to allow of the escape of air while gasolene is being pumped into the receptacle. The weight of the balls is preferably sufficient to prevent the escape of gas through said valves under ordinary conditions, as where the pump is idle.

The wall of the glass cylinder L is provided, preferably by engraving, with a vertically disposed scale whereby the number of gallons or other units of gasolene pumped into the receptacle may be accurately determined before being dispensed. Said scale is numbered both upwardly and downwardly for convenience in measuring when the level is either rising or falling in the receptacle.

When a quantity of gasolene is to be sold to a customer, the doors F and G are unlocked and opened and the hose J drawn out and its nozzle or outer end inserted in the automobile tank or other container to be filled. The cocks 18 and 22 being closed, the handle 14 is adjusted to the pump shaft 11 and the pump operated until the required amount of gasolene is raised through the pipe 10 into the pipe 30 and out through the perforations 35 into the interior of the measuring receptacle, the quantity of liquid being shown by the relation of the level of the later to the scale. If an excess of liquid over and above the quantity ordered is pumped into the receptacle, the cock 22 is opened long enough to allow such excess to escape through the pipe 21 into the supply pipe 10. The cock 22 is now closed and the cock 18 opened, allowing the gasolene to flow from the receptacle into the automobile tank of the customer. Any water in the gasolene will descend into the sump 19 which may be drained when necessary by means of the cock 20. If less than the entire quantity held in the receptacle is needed by the customer, the descending scale is used to show when the desired quantity of liquid has been dispensed.

The hose is now removed from said tank and its intermediate portion is permitted to loop down out of the way in the interior of the base A while the nozzle may be laid on the platform B. The handle 14 is then slipped off from the shaft 11 and laid on said platform, and the doors F and G are then closed and locked.

It is evident that the glass cylinder, its bottom plate and its lid are clamped together by means of the pipe 30 and the cap 33, and the complete measuring receptacle may be removed as a unit from the station by loosening the screw bolts 23, and that said receptacle or a substitute receptacle may be mounted in the station by screwing up the said bolts 23 again. This facilitates repairs and dispenses with the services of an expert workman.

It is also evident that the gasolene is measured in plain sight of the customer and not within the pump barrel or in some concealed portion of the station, so that a customer sees what he gets and gets what he sees.

The glass walled measuring receptacle not only enables the customer to see at a glance the amount of fluid he is getting, but its capacity and measurements are constant and remain accurate as the walls of the receptacle cannot be dented in or bent. The method of introducing the gasolene into the interior of the receptacle prevents frothing and undue gasifying of the liquid, and no back flow or escape into or through the pump is possible.

The ball valves in the upper portion of the measuring receptacle permit the escape of air while the liquid is being pumped in but prevent leakage of gas into the surrounding atmosphere when the station is not in active use.

When the station is not in use and the doors are closed and locked, the operative mechanism is entirely inclosed and protected from the weather and from unauthorized tampering.

The delivery hose is concealed and protected when not in use and is readily drawn out or pushed back without danger of kinking or rupture.

The entire apparatus is of inexpensive yet substantial and durable construction, and will not become inaccurate or inefficient from use.

What I desire to claim is:—

1. In dispensing and measuring apparatus of the character described, the combination of a base, a pump mounted on said base, a base plate mounted above said pump and provided with an inlet port communicating with the discharge of said pump and an outlet port, a bottom plate detachably mounted on said base plate and provided with an inlet port and an outlet port registering with the corresponding ports in said base plate, a bottomless glass walled measuring receptacle mounted on said bottom plate, a stand pipe within said receptacle extending up from the inlet port in said bottom plate, and means for clamping said bottom plate, receptacle and stand pipe together so that they may be installed on or removed from the base plate as a unit, substantially as and for the purpose described.

2. In dispensing and measuring apparatus of the character described, the combination of a base, a pump mounted on said base, a base plate mounted above said pump and provided with an inlet port communicating with the discharge of said pump and an outlet port, a bottom plate detachably mounted on said base plate and provided with an inlet port and an outlet port registering with the corresponding ports in said base plate, a stand pipe having its lower end fixed in the inlet port of said bottom plate and provided with discharge openings near its top, a bottomless glass walled receptacle mounted on said bottom plate, a lid for the top of said receptacle secured to the upper end of said stand pipe, and means for clamping said bottom plate, stand pipe, lid and receptacle together so that they may be installed on or removed from the base plate as a unit, substantially as described.

3. In dispensing and measuring apparatus of the character described, in combination with a base and a pump mounted on said base and having its inlet connected to the gasolene supply, a measuring receptacle comprising a bottom plate mounted above said pump, provided with an axial opening connected to the outlet of said pump, and a perforated standpipe screwed into said opening, a glass cylinder having its lower end seated on said bottom plate, a lid for said cylinder through which said standpipe protrudes, and a cap for the end of said standpipe bearing on said lid whereby the receptacle is clamped together.

Signed at Emlenton, this 21st day of October, 1916.

DAVID A. CRAWFORD.